US005603533A

United States Patent [19]

Hayashi

[11] Patent Number: 5,603,533

[45] Date of Patent: Feb. 18, 1997

[54] TUBE FLANGE ASSEMBLY

[76] Inventor: Toshiomi Hayashi, 2-18-7 Omachi Nishi, Asaminami-ku, Hiroshima-shi, Hiroshima-ken, Japan

[21] Appl. No.: 554,812

[22] Filed: Nov. 7, 1995

[30] Foreign Application Priority Data

Nov. 8, 1994 [JP] Japan .................................... 6-300322

[51] Int. Cl.[6] ...................................................... F16L 25/00

[52] U.S. Cl. .................................... 285/334.2; 285/382.2; 285/397; 285/405; 285/424

[58] Field of Search .................................... 285/424, 363, 285/405, 334.5, 382.2, 334.2, 397

[56] References Cited

U.S. PATENT DOCUMENTS

| | | | |
|---|---|---|---|
| 2,011,433 | 8/1935 | Blagg et al. | 285/371 X |
| 2,464,506 | 3/1949 | Hirschfeld | 29/512 |
| 3,786,730 | 1/1974 | Lunderholm | 29/512 X |
| 3,794,363 | 2/1974 | Schulz | 285/363 |
| 4,212,099 | 7/1980 | Williams et al. | 29/512 X |
| 4,558,892 | 12/1985 | Daw et al. | 255/363 X |
| 4,865,365 | 9/1989 | Meinig | 285/424 X |
| 4,940,264 | 7/1990 | Mez | 285/405 |
| 5,213,374 | 5/1993 | Keeting | 285/331 |
| 5,415,443 | 5/1995 | Hayashi | 285/405 |
| 5,421,624 | 6/1995 | Hayashi et al. | 285/334.2 |

FOREIGN PATENT DOCUMENTS

| | | | |
|---|---|---|---|
| 487727 | 12/1964 | Italy | 285/405 |
| 5039888 | 2/1993 | Japan | 285/405 |
| 777493 | 6/1957 | United Kingdom | 285/398 |

*Primary Examiner*—Dave W. Arola
*Attorney, Agent, or Firm*—Lyon & Lyon

[57] ABSTRACT

A tube flange assembly including attachment flanges associated by interlocking deformation with flared tubes. The flanges are placed with the attachment plates thereof arranged in juxtaposition with a tubular insert extending to within the tubes. A raised section on the tubular insert mates with the concavities formed in the annuluses of the flanges. The joint is drawn together by fasteners. Each attachment flange includes a fixing area for receiving the end of the tube. Outwardly of that fixing area, an annular channel forming a loop in cross section with the small circular gap provides tolerance to vibration.

7 Claims, 7 Drawing Sheets

TUBE FLANGE ASSEMBLY

BACKGROUND OF THE INVENTION

The field of the present invention is structures for joining flanges and tubes.

Mechanisms have been used for joining pipes including flanges where the flanges are threaded, welded, braised, etc. onto the tube ends. Such mechanisms for joining such flanges can be cumbersome, environmentally damaging and complicated in structure and fabrication. A lightweight flange, resistant to oxidation at high temperatures and having a strong joint with high sealing capabilities has been presented in U.S. Pat. No. 5,415,443, originating from Japanese Patent Application 1992-273346. This lighter weight, comparatively advantageous structure finds disadvantage in uses such as automotive exhaust systems because of vibrations generated from the engine, etc. Expensive gaskets may also be required for such uses.

SUMMARY OF THE INVENTION

The present invention is directed to a tube flange assembly which provides flexibility to accommodate vibration.

In a first, separate aspect of the present invention, an attachment flange is assembled with a tube end through deformation of the components. An annular corrugation in the attachment flange adjacent the deformed structure retains a small annular gap acting to provide some isolation to the attachment plate outwardly of the associated tube.

In a second, separate aspect of the present invention, the assembly of the first aspect further contemplates the corrugation including an arcuate, annular portion substantially wider than the annular gap so as to insure appropriate isolation.

In a third, separate aspect of the present invention, the assembly of either of the foregoing aspects further includes a flange and tube assembly with a tubular insert extending therebetween.

Accordingly, it is an object of the present invention to provide an improved tube flange assembly. Other and further objects and advantages will appear hereinafter.

DETAILED DESCRIPTION OF THE PREFERRED EMBODIMENT

Figure 1:
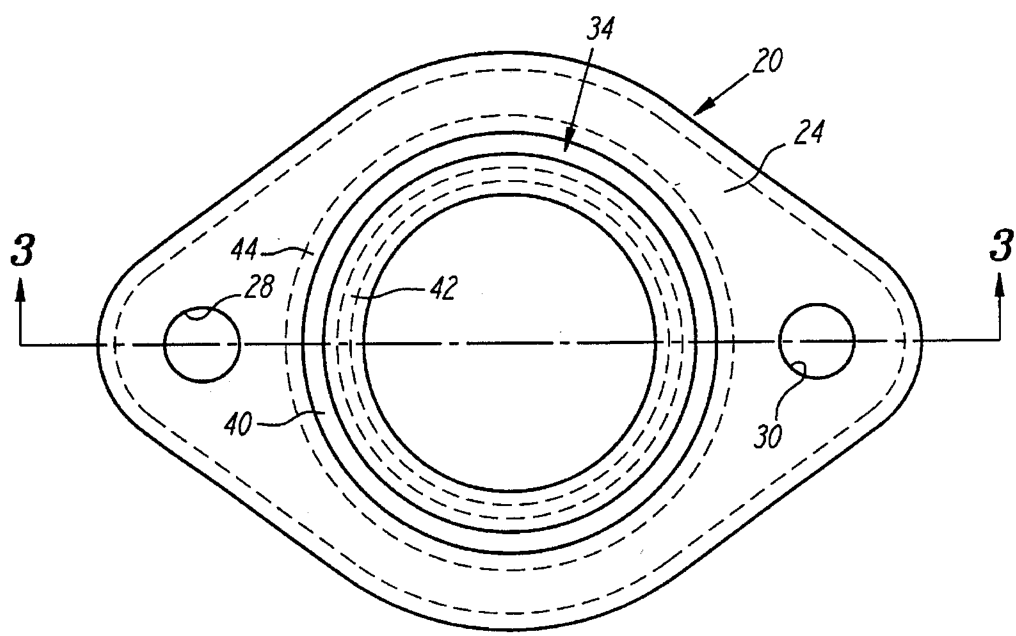
FIG. 1 is a plan view of an attachment flange.
Figure 2:
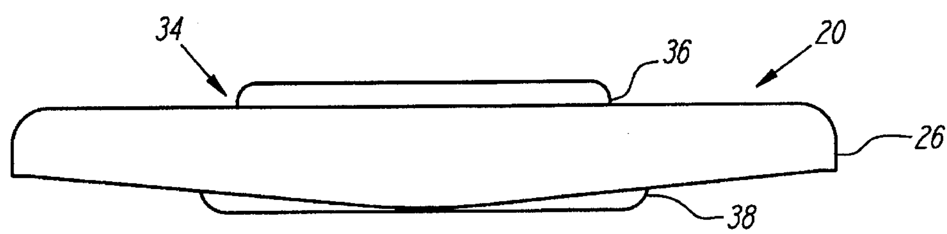
FIG. 2 is a side view of the attachment flange of FIG. 1.
Figure 3:
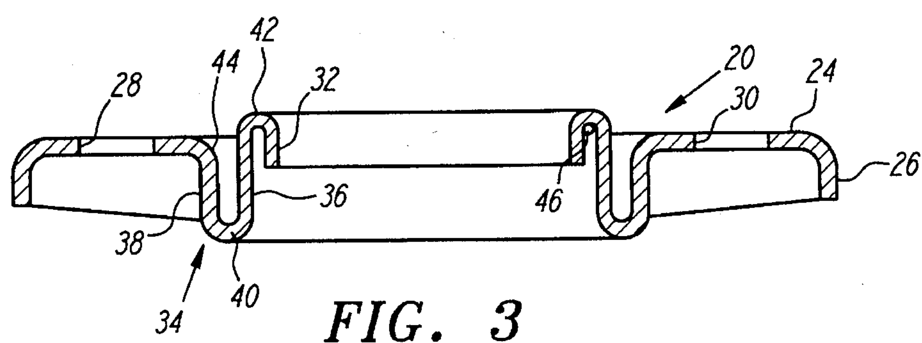
FIG. 3 is a cross-sectional view taken along line 3—3 of FIG. 1.

Turning in detail to the drawings, FIGS. 1 through 3 illustrate the unassembled form of the attachment flange, generally designated 20. With this flange 20, a tube flange assembly is constructed through association of a tube 22. The flange is formed by drawing to define an attachment plate 24 having an outer stiffening skirt 26 and holes 28 and 30 for engagement. The attachment flange 20 also includes an annulus 32 and an annular corrugation, generally designated 34. The annular corrugation 34 is located between the attachment plate 24 and the annulus 32. The annular corrugation 34 defines an open annular channel between an inner annular wall 36 and an outer annular wall 38. Extending between the two is an arcuate, annular portion 40. Curved transitional portions 42 and 44 join the annulus 32 to the inner annular wall 36 and the attachment plate 24 to the outer annular wall 38, respectively.

Figure 4:
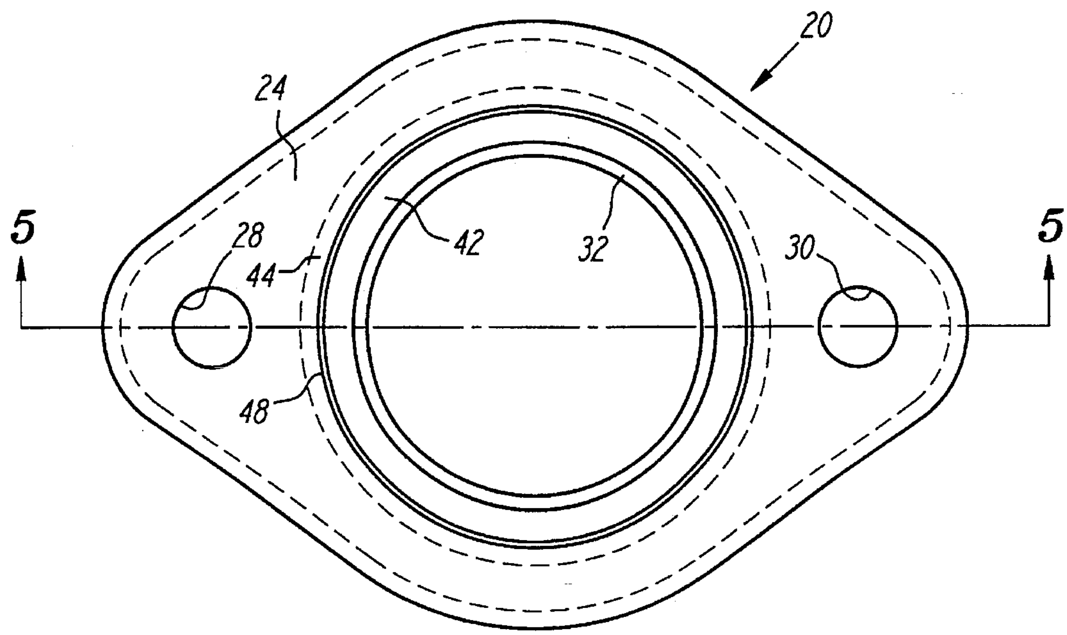
FIG. 4 is a plan view of the flange of FIG. 1 assembled with a tube.
Figure 5:
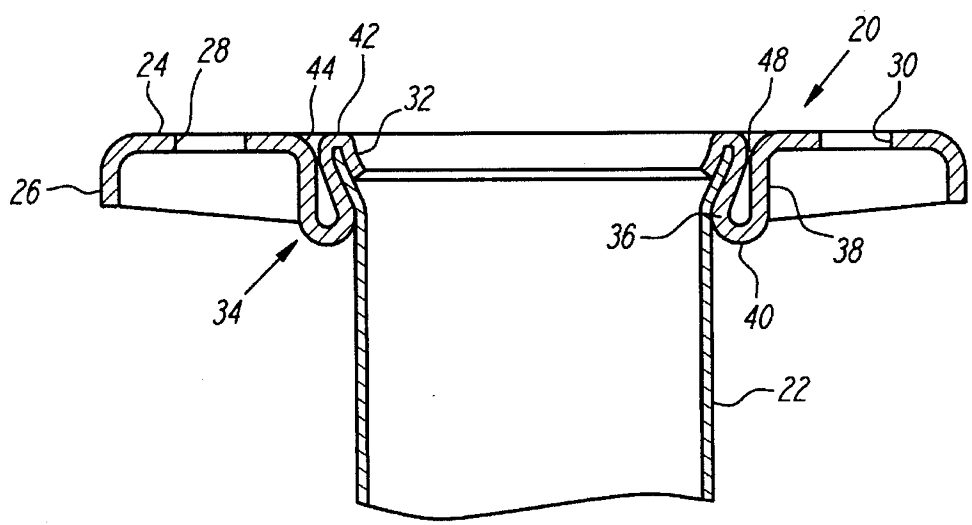
FIG. 5 is a cross-sectional view taken along line 5—5 of FIG. 4.
Figure 6:
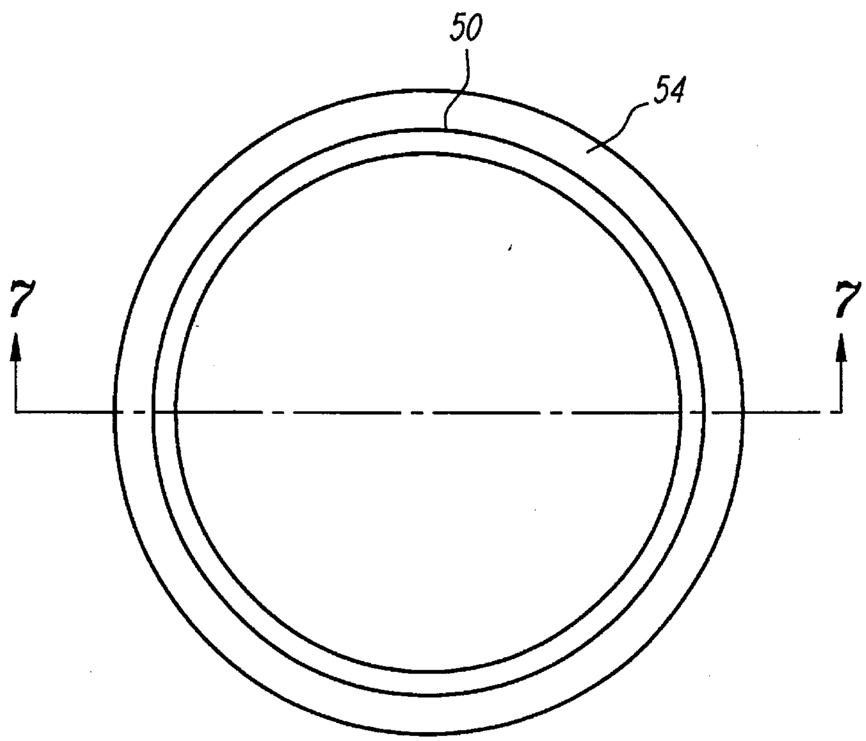
FIG. 6 is an end view of a tubular insert.
Figure 7:
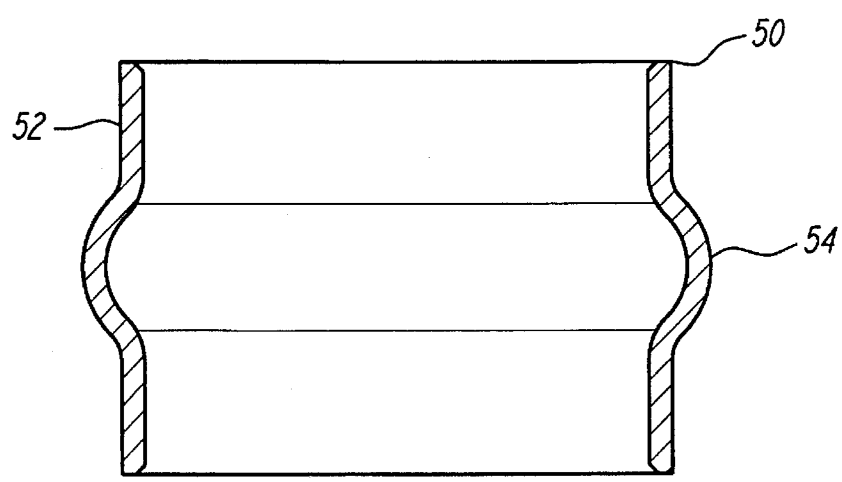
FIG. 7 is a cross-sectional view taken along line 7—7 of FIG. 6.

FIGS. 4 and 5 illustrate the tube flange assembly as including the attachment flange 20 assembled with the tube 22. The end of the tube 22 is inserted into the annular fixing area 46 defined between the annulus 32 and the inner annular wall 36. The inner annular wall 36 is an area folded back from the annulus 32 and extends about the outside of the end of the tube 22. Deformation of this assembly by forcing the annulus 32 outwardly causes a flaring of the end of the pipe and a compression of the fixing area 46. The folded back inner annular wall 36 is also deformed outwardly. The deformation is such that the lower extent of the inner annular wall 36 is at the base of the outward flaring of the tube 22. The deformation is also such that a small annular gap 48 having a width in the radial direction of 0.3 to 0.5 mm is retained between the inner annular wall 36 and the outer annular wall 38. The outer annular wall 38 is shown to be minimally deformed, if at all.

The assembly through deformation of the attachment flange 20 and the end of the tube 22 results in a structure which provides for sufficient interlocking and gripping between the components and yet allows for sufficient vibration isolation as well. Viewing the cross section of the annular corrugation 34, it can be seen that the arcuate, annular portion 40 remains substantially wider than the small annular gap 48 so that a loop extending annularly remains as well. This entire structure is understood to contribute to the vibration isolation effect such that strength is maintained with less material thickness with cracking being prevented.

Figure 8:
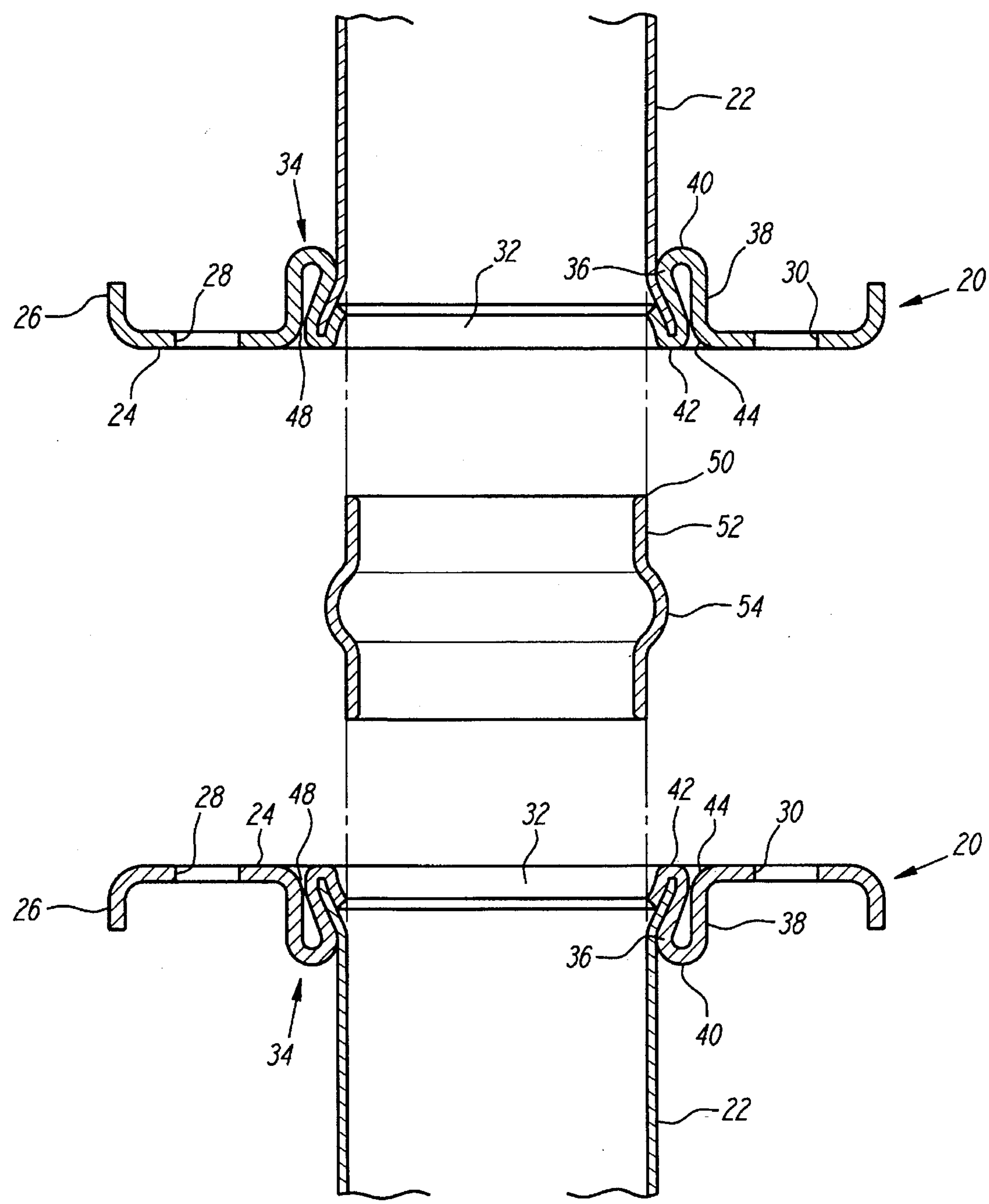
FIG. 8 is an exploded assembly view in cross section of two tube flanges associated with tubing and a tubular insert.
Figure 9:
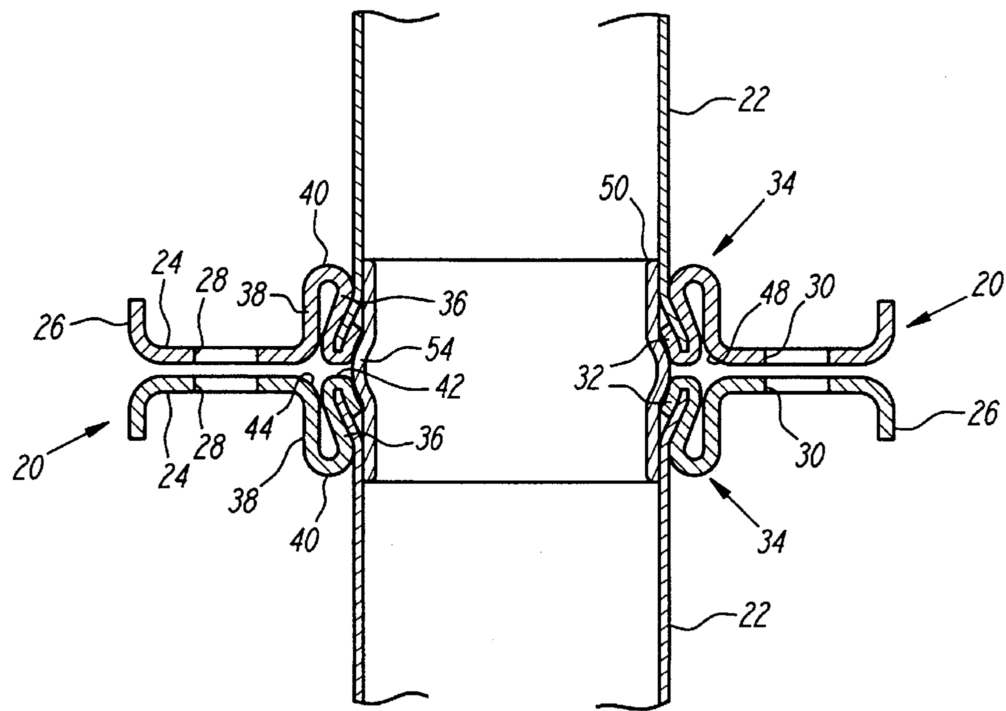
FIG. 9 is a cross-sectional view of the assembled components illustrated in FIG. 8.
Figure 10:
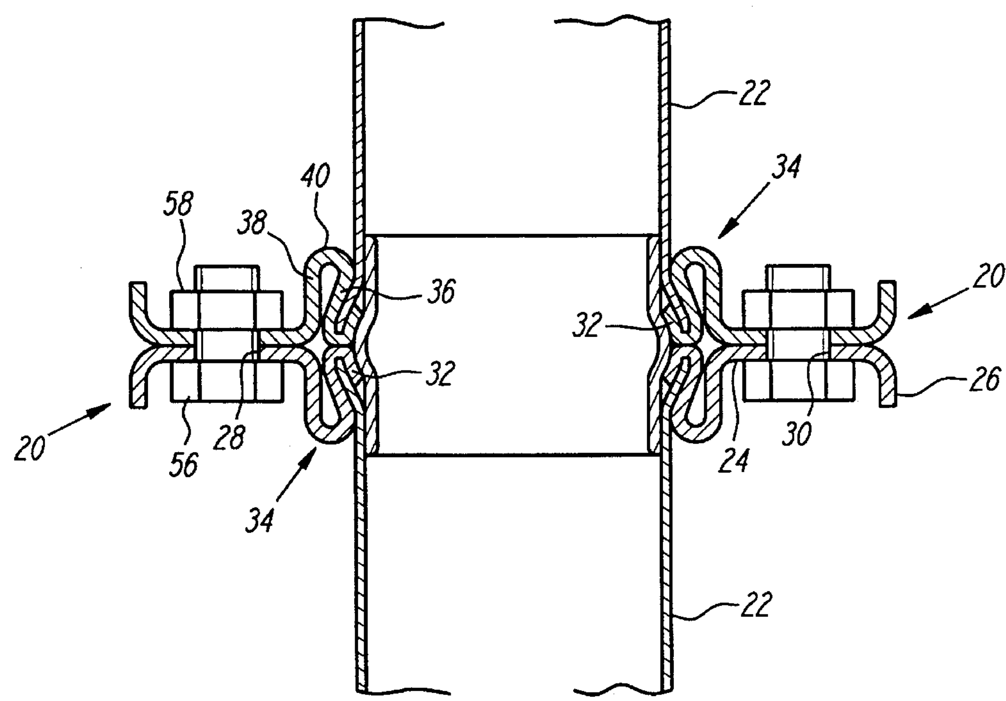
FIG. 10 is a cross-sectional view of the assembly of FIG. 9 with fasteners included.
Figure 11:
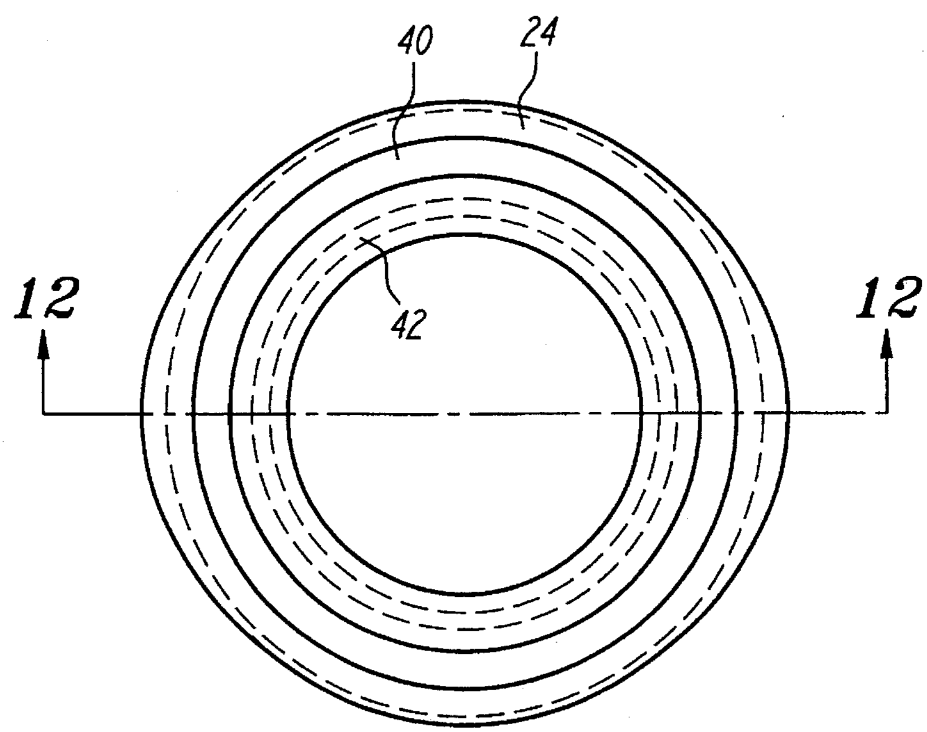
FIG. 11 is a plan view of a second attachment flange.
Figure 12:
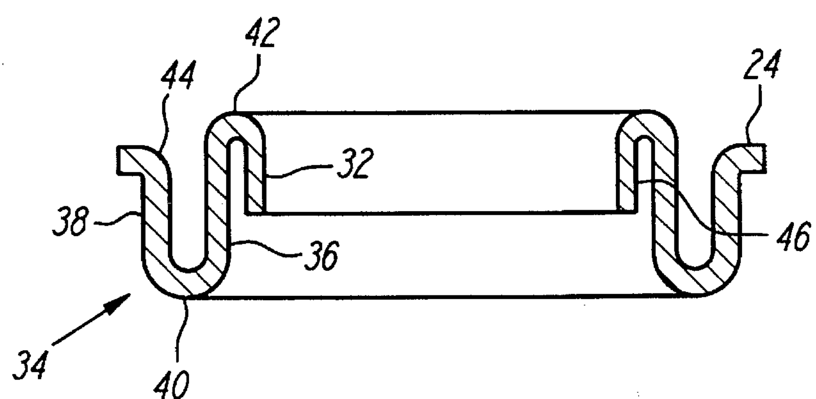
FIG. 12 is a cross-sectional view taken along line 12—12 of FIG. 11.
Figure 13:
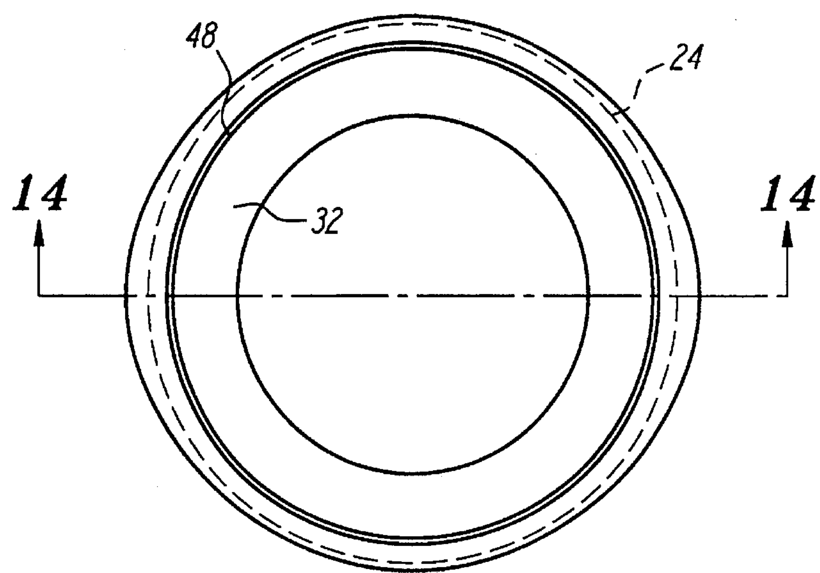
FIG. 13 is a plan view of the attachment flange of FIG. 11 assembled with a tube.

The tube flange assembly may further include the mating of two similar assemblies of an attachment flange 20 and a tube 22. FIGS. 8 through 10 disclose the procedure and result of such assembly. In addition to the two assemblies of attachment flanges 20 and tubes 22 arranged with the attachment plates 24 drawn into juxtaposition, a tubular insert 50 is employed. The tubular insert 50 includes a cylindrical outer surface 52 arranged to fit closely within the tubes 22. The tubular insert 50 further includes an annular raised portion 54 at the midsection thereof. This annular raised portion 54 is shown to have a profile which closely approximates the seats in the attachment flanges 20 defined by the deformation of each annulus 32. FIG. 9 illustrates the two assemblies of attachment flanges 20 and tubes 22 brought into position with the attachment plates 24 in juxtaposition and the tubular insert 50 in place. FIG. 10 shows a conclusion of the assembly through the addition of fasteners associated with the holes 28 and 30. In this embodiment, the fasteners include bolts 56 and nuts 58.

Figure 14:
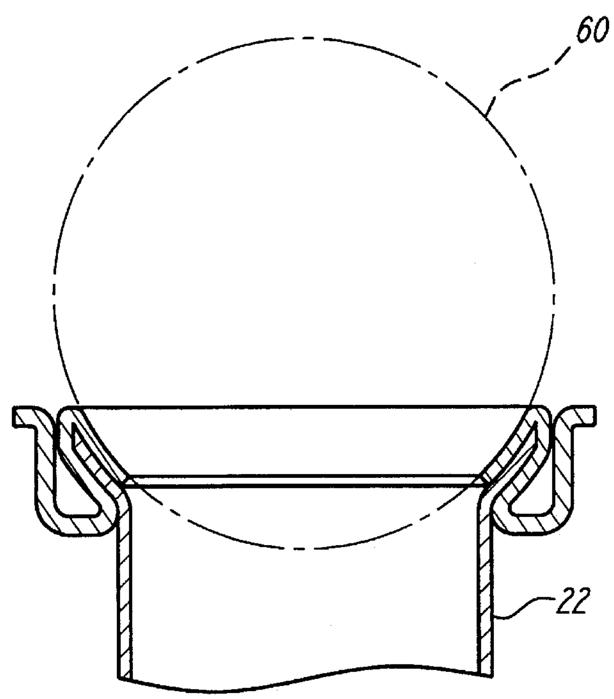
FIG. 14 is a cross-sectional view taken along line 14—14 of FIG. 13.

The first embodiment illustrated includes a conventional diamond shaped attachment plate 24. Circular or elliptical flanges may also be employed such as illustrated in a second embodiment in FIGS. 11 through 14. Otherwise, these structures are substantially the same with corresponding numbering as applied to the first embodiment. This second embodiment further contemplates the use of a spherical deformation as illustrated by the ball 60 shown in phantom in FIG. 14. The inner surface of the annulus 32 is preferably finished at 4 microns or less.

Thus, joint structures are disclosed for tubes which accommodate substantial vibrations so as to be useful in automotive exhaust systems and the like. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A tube flange assembly comprising an attachment flange having an attachment plate, an annulus inwardly of the attachment plate and an annular corrugation forming an open annular channel having an inner annular wall and an outer annular wall between the annulus and the attachment plate, the inner annular wall being attached to the annulus and the outer annular wall being attached to the attachment plate;

a tube having a tube end interengaged with the attachment flange between the annulus and the annular corrugation, the annulus, the inner annular wall and the interengaged tube end being deformed outwardly toward the attachment plate to interlock the tube end with the flange, the inner annular wall and the outer annular wall defining a small annular gap to retain the corrugation as an open annular channel, the tube being outwardly tapered approaching the tube end.

2. The tube flange assembly of claim 1 further comprising a second attachment flange having a second attachment plate and a second annulus inwardly of the second attachment plate, the second attachment plate and the second annulus being fixed together;

a second tube having a second tube end interengaged with the attachment flange outwardly of the second annulus, the second annulus and the second tube end being deformed outwardly toward the attachment plate;

a tubular insert having a cylindrical outer surface with an annular raised portion at the midsection, the tubular insert closely fitting within each of the tube and the second tube and the annular raised portion closely fitting within the deformed annulus and the deformed second annulus with the attachment flange and the second attachment flange juxtaposed.

3. The tube flange assembly of claim 2, the corrugation including an arcuate, annular portion between the inner annular wall and the outer annular wall substantially wider than the small annular gap defined by the inner annular wall and the outer annular wall and spaced from the small annular gap.

4. The flange assembly of claim 3, the small annular gap being 0.3 to 0.5 mm wide.

5. The tube flange assembly of claim 1, the corrugation including an arcuate, annular portion between the inner annular wall and the outer annular wall substantially wider than the small annular gap defined by the inner annular wall and the outer annular wall and spaced from the small annular gap.

6. The flange assembly of claim 5, the small annular gap being 0.3 to 0.5 mm wide.

7. The flange assembly of claim 1, the small annular gap being 0.3 to 0.5 mm wide.

* * * * *